United States Patent [19]

Noguchi

[11] 3,765,751
[45] Oct. 16, 1973

[54] ZOOMING DEVICE FOR ZOOM LENSES
[75] Inventor: Yoshiro Noguchi, Osaka, Japan
[73] Assignee: Minolta Camera Kabushiki Kaisha, Osaka-shi, Japan
[22] Filed: Dec. 21, 1970
[21] Appl. No.: 99,832

[30] Foreign Application Priority Data
Dec. 22, 1969 Japan.......................... 44/121767
Dec. 22, 1969 Japan.......................... 44/121768

[52] U.S. Cl................................ 350/252, 350/255
[51] Int. Cl. ............................................ G02b 7/02
[58] Field of Search.................... 350/245, 252, 255, 350/187

[56] References Cited
UNITED STATES PATENTS
3,399,015  8/1968  Jacobs ............................... 350/255
3,095,750  7/1963  Mahn.................................. 350/187
3,445,155  5/1969  Sturrock ............................ 350/255
2,547,187  4/1951  Walker .............................. 350/187

Primary Examiner—David Schonberg
Assistant Examiner—Michael J. Tokar
Attorney—Watson, Cole, Grindle & Watson

[57] ABSTRACT

A zooming device for zoom lenses is provided with a zooming component and a compensating component which are moved in the optical axis direction to be adjusted, wherein two guide rods are provided on one side in the lens barrel. A zooming component frame formed with a slot at right angles to the optical axis direction is fitted slidably on one of the rods, and a compensating component frame provided with an engage pin is fitted on the other rod. A cam plate provided with a working pin fitted in said slot and a cam slot in which said engage pin fits is pivoted rotatably on the lens barrel by a shaft at right angles to the optical axis and said slot. Therefore, by turning said cam plate, said zooming component frame and said compensating component frame are adjustably moved to change the magnification.

7 Claims, 8 Drawing Figures

INVENTOR.
BY Yoshio Noguchi
Watson, Cole, Grindle & Watson

INVENTOR.
BY Yoshio Noguchi
Watson, Cole, Grindle & Watson

ZOOMING DEVICE FOR ZOOM LENSES

BACKGROUND OF THE INVENTION

The present invention relates to a zooming device for zoom lenses, which adjustably moves a zooming component and a compensating component, and, more particularly, a zooming device in zoom lenses, which adjustably moves the zooming component and a compensating component by means of a cam plate pivoted rotatably on the lens barrel.

In one of the prior art zooming devices, which adjustably moves the zooming component and a compensating component in the optical axis direction to change the magnification, the exterior barrel is rotatably fitted on the intermediate fixed barrel so as to be unable to move relatively in the axial direction. The interior barrel for changing the magnification having the zooming component, and the interior barrel for compensating having the compensating component are slidably fitted in said intermediate fixed barrel. Also a slot parallel to the optical axis direction is provided on said exterior barrel or said intermediate fixed barrel and a spiral slot using the optical axis as an axis is provided on the other of them. A pin projected from said interior barrel for changing the magnification and said interior barrel for compensating, passes through the point of intersection of both slots so as to turn one of said both barrels to effect a displacement.

Therefore, it is indispensable to form a spiral slot on said exterior barrel or intermediate barrel, or both barrel interiors.

However, to form such a spiral slot into the fixed shape on the cylindrical surface of the barrel is very difficult to achieve, and to form it with any degree of accuracy is also difficult.

Besides, between interior and exterior barrels there is a sliding surface which is slidable relative to each other and said sliding surface cannot be formed into a roughened surface, so that an internal reflection of an inclined ray effect by said sliding surface is emitted, which only results in a disturbance ray to the picture frame.

OBJECT OF THE INVENTION

An object of the present invention is to provide a zooming device for zoom lenses, which avoids the prior drawbacks mentioned above and which has a more easily workable zooming component and a compensating component easily workable.

Another object of the present invention is to provide a zooming device for zoom lenses, which is easy in working and is highly accurate.

A further object of the present invention is to provide a zooming device for zoom lenses, the zooming component frame and compensating component frame of which are adjustably movable by means of a cam plate having a rotary shaft at right angles to the optical axis.

A further object of the present invention is to provide a zooming device for zoom lenses, in which the area of sliding surface is small and the internal reflection light quantity is decreased.

A still further object of the present invention is to provide a zooming device for zoom lenses, the zooming component frame and compensating component frame of which are adjustably movable by means of a guide rod having a small sliding surface.

Other objects of the present invention will become apparent from a description of an embodiment disclosed hereinafter in accordance with the present invention.

SUMMARY OF THE INVENTION

In order to attain the aforementioned objects, two guide rods for "with" after parallel parallel with the optical axis are provided on one side in the exterior barrel for the zoom lens. A zooming component is provided and a zooming component frame having a slot at right angles to said optical axis is slidably fitted on one of the guide rods and on a compensating component is provided and a compensating component frame having a projecting engagement is slidably fitted on the other guide rod. One working pin and a cam slot are formed on a cam plate rotatably connected to said exterior barrel by a shaft at right angles to said optical axis so that the working pin fits in and engages with said slot on said zooming component frame. The cam slot fits on and engages with the engagement pin provided on said compensating component frame.

FEATURE OF THE INVENTION

Since the present invention is formed as described above, upon turning said cam plate, the working pin thereof engages with the slot at right angles to the optical axis on the zooming component frame to press it and the zooming component frame, which is slidably fitted in the guide rod, parallel to the optical axis. It is pushed to move only in the optical axis direction by the component of force in the optical axis direction, and the engage pin provided on the compensating component frame engages with the cam slot to be pressed. The compensating component frame movable to the optical axis and sliding together with the guide rod is adjustably moved in the optical axis direction by a displacement component of the cam slot in the optical axis direction so as to effect the zooming. And, the operation of zooming is characterized by means of the cam slot formed on the planar cam plate and the working pin.

DESCRIPTION OF THE PREFERRED EMBODIMENT

Figure 1:
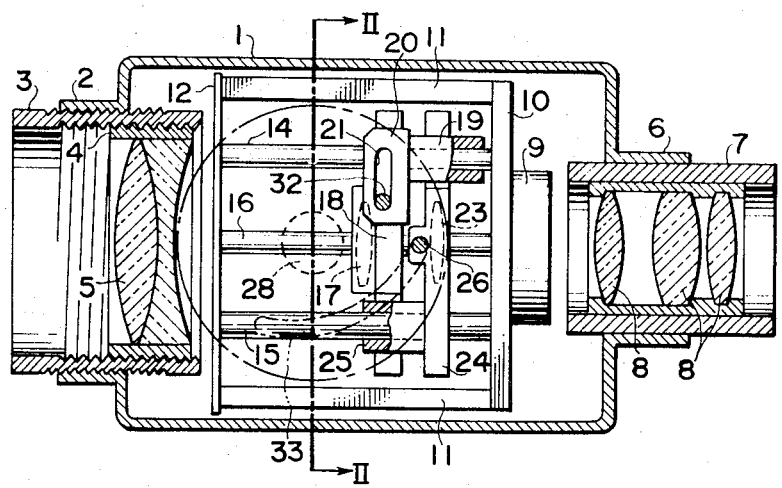
FIG. 1 is a side view in longitudinal section of an embodiment in accordance with the present invention, showing the zoomed telescopic condition.
Figure 2:
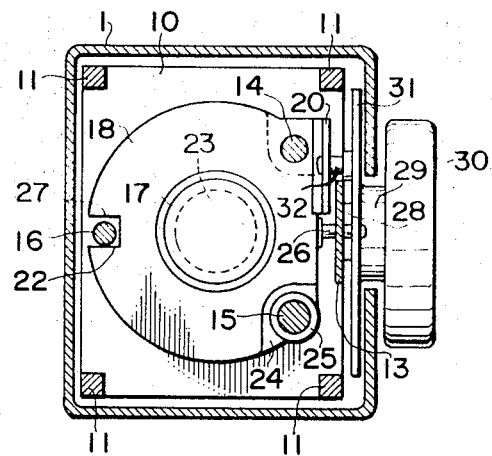
FIG. 2 is a front view in transverse section taken along line II—II of FIG. 1.

In FIGS. from 1 to 4, the exterior barrel 1 for the zoom lenses is shown as having an angular-cylindrical configuration at its central portion and formed into a short-cylindrical shape at both ends. A focussing barrel 3 is threadedly engaged within the short-cylindrical body 2 at its front end, and a lens barrel 4 holding a focusing lens 5 therein is threadedly engaged within barrel 3. By turning said focusing barrel 3, focusing lens 5 moves back and forth along the optical axis.

In a barrel 7 fitted fixedly in a short-cylindrical body 6 at the rear end of exterior barrel 1, an image forming lens 8 is held for allowing the optical axis to coincide with that of said focusing lens 5.

Figure 3:
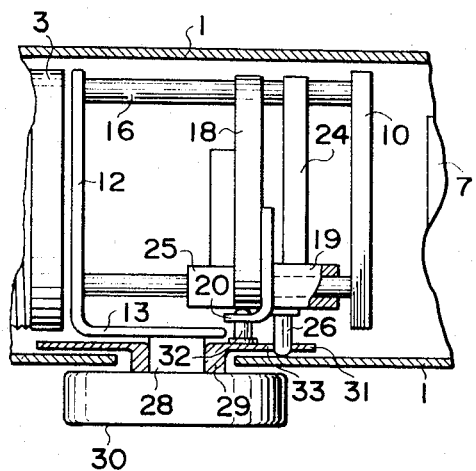
FIG. 3 is a partial top view in longitudinal section including the optical axis of FIG. 1.
Figure 4:
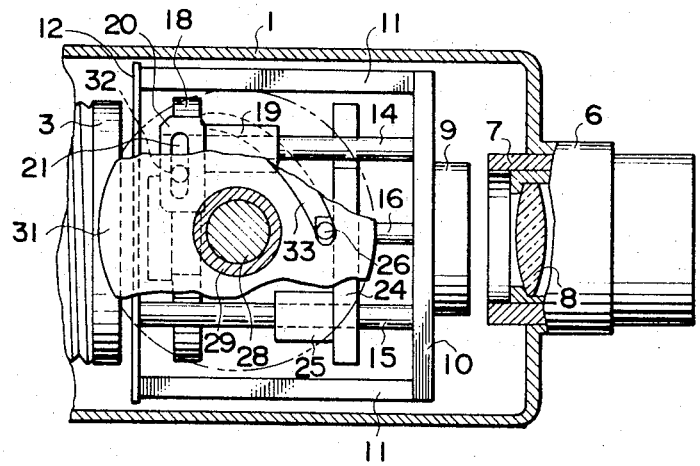
FIG. 4 is a partial side view in longitudinal section of said embodiment zoomed for the wide angle.

A rear frame 10 is fixedly mounted in barrel 1 between lens 5 and lens 8 by means of a fitting member 9 on the image forming lens 8 side. Said rear frame 10 is, a square-shaped planar body, and supported at right angles to the optical axis and is provided at its central portion with an opening through which incident light rays pass. Four supports 11 project forwardly from the four corners of frame 10 and, on the front ends thereof, a front frame 12 similar in shape to the rear frame, is supported to form a holding frame. A bent member 13 perpendicularly extends rearwardly from frame 12, as clearly shown in FIG. 3.

Further, two guide rods 14, 15 are provided between frames 10 and 12 parallel the optical axis near bent member 13, and a restraining rod 16 is also provided in parallel to the optical axis on the opposite side of guide rods 14, 15.

A zooming component frame 18 holding a zooming component 17 so as to allow its optical axis to coincide with the optical axes of said focusing lens 5 and image forming lens 8, has a shaft bracket 19 slidably fitted on one rod 14, and a projecting member 20 formed parallel to bent member 13. A slot 21 is provided in member 20 in extending a direction at right angles to the optical axis (perpendicular in FIG. 1).

A compensating component frame 24, holding a compensating component 23 so as to allow its optical axis to coincide with the optical axes of said focusing lens 5, image forming lens 8, and said zooming component 17, has a shaft bracket 25 slidably fitted on the other rod 15, said bent member 13 projecting at right angles to the optical axis, and an engagement pin 26 projecting perpendicularly thereto. Said zooming component frame 18 and compensating component frame 24 are each provided with restraining notches 22, 27 at a location above the optical axis, for the reception of restraining rod 16 which prevents turning of said both component frames 18, 24.

A shaft bracket 29 is rotatably fitted on a shaft 28 which projects outwardly and perpendicularly from said bent member 13. A knob 30 is fixedly mounted on the outer end of said shaft bracket 29, and a cam plate 31 is mounted on the inner end of said shaft bracket 29; parallel to bent member 13. A working projection 32 extends from plate 31 at right angles to bent member 13. Also, a cam slot 33, having a variable radius, is provided in plate 31. Said working projection 32 is disposed for movement within slot 21, and engagement pin 26 is disposed for movement within slot 33.

Therefore, upon the turning of knob 30, working pin 32 engages with slot 20 to press projecting member 21, and zooming component frame 18 guided by guide rod 14 is pressed to move by the component of force in the optical axis direction. And, as cam slot 33 presses engagement pin 26, compensating component frame 24 guided by guide rod 15 is pressed to move by the component of force in the optical axis direction, and thus both said component frames 18, 24 are adjustably moved to change the magnification.

Figure 5:
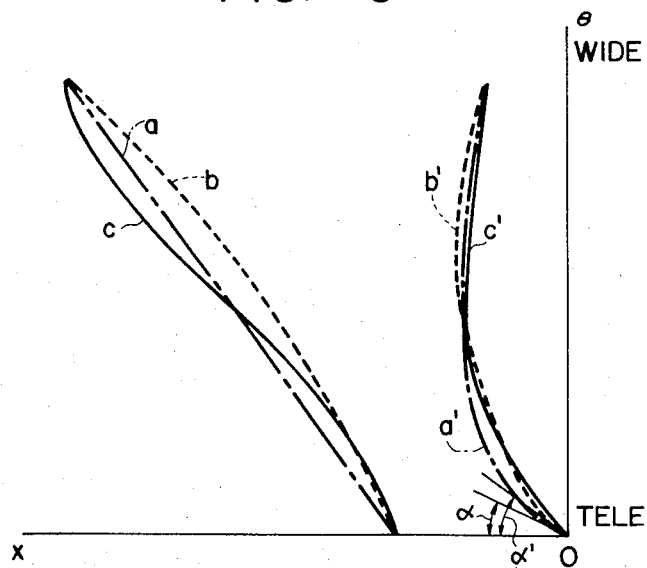
FIG. 5 is a diagram showing the relation between the turning angle of the cam plate and the moving adjustment quantity of the zooming component and the compensating component in said embodiment.

FIG. 5 is a diagram showing the relation of the moving quantity between zooming component 17 and compensating component 24 adjustably moved as described above, wherein the ordinate axis $\theta$ shows the turning angle of cam plate 31 and the abscissa axis X shows the moving quantity of said both components 17, 23. The ordinate axis can be taken to show the focal length of the zoom lenses using the turning angle of cam plate 31 as a parameter. Accordingly, when $\theta$ is small the zoom lenses are in the telescopic condition and when $\theta$ is large they are in a wide angle.

Now, provided that relative to the turning of cam plate 31 the moving quantity of zooming component 17 is linearly changed as shown by chain line $a$, the moving quantity of compensating component 23 corresponding to said moving quantity of zooming component 17 is as shown by chain curve $a'$, and the moving quantity to the turning angle of cam plate 31 in the telescopic range becomes larger. This makes the turning of cam plate 31 heavier. In order to make this lighter it is only required to arrange it so as to increase the angle $\alpha$ which the tangent embraces at point O. For this purpose, when a spiral slot such as 33 is used, the relation between the zooming component and the turning angle of the barrel provided with such spiral slot is such as to describe a shape as shown by broken line $b$ in FIG. 5. Accordingly, the relation between the moving quantity of the compensating component and said turning angle is as shown by curve $b'$ and said angle $\alpha'$ in the telscopic range is larger than $\alpha$ thereby making a lighter turn possible. However in the wide angle range, the moving quantity of the compensating component to the turning angle is larger as compared with curve $a'$ and its effect cannot be said to be perfect.

Figure 6:
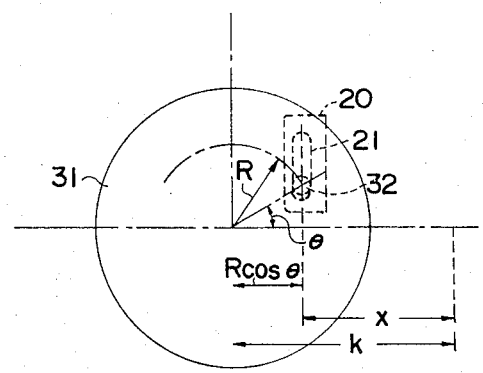
FIG. 6 is an illustrative diagram of the delivery operation of the cam plate in said embodiment.

In the present invention the relation between the turning angle of cam plate 31 and displacement X of zooming component 17 is as shown in FIG. 6, namely, $$X = K - R \cos \theta$$

As seen in the above embodiment, upon turning working pin 32 nearly symmetrically using $\theta = 90°$ as a center so that the longest focal length is taken in the case of $\theta \approx 45°$ and the shortest focal length is taken in the case of $\theta \approx 135°$, said formula forms the curve shown by S-shaped full line using straight line a as a center, as shown by a chain line in FIG. 5. The rate of the moving quantity of zooming component 17 to the turning angle of cam plate 31 is small both in the telescopic range and the wide angle range, with the maximum being in the middle. The moving quantity of the compensating component 23 to correspond to the movement of said zooming component 17 forms curve $c'$ shown by the full line in FIG. 5 and is the smallest in the moving quantity and yet uniform. Therefore, the driving force required, when cam plate 31 is turned from the telescopic range to the wide angle range or oppositely from the wide angle range to the telscopic range, becomes uniform and its operation becomes smooth in the case of manual operation as well as automatic operation.

In the above embodiment, the sliding portions of zooming component frame 18 and compensating component frame 24 are guide rods 14, 15, so that their sliding areas are small as compared with those where the prior barrels slide with relative to one other. Therefore, the reflection rays of inclined light flux on the sliding area can be weakened. However, in the second embodiment shown in FIG. 7 and FIG. 8 in accordance with the present invention, this is more decreased and at the same time arranged so that guide rod 15 does not disturb the picture image light rays. In the first embodiment the undesirable moment applied to zooming component frame 18 by working pin 32 becomes a space between guide rod 14 and working pin 32; however, as described above working pin 32 moves nearly between 45° and 135°, so that it is on the upper part of the horizontal plane including the optical axis. Therefore guide rod 14 can be provided on the upper part of the holding frame. It is desirable for engagement pin 26 to be provided on compensating component frame 24 near the horizontal plane including the optical axis. And, in order to decrease the undesirable moment of compensating component frame 24 effected by said engagement pin 26 and guide rod 15, it is desireable to locate guide rod 15 near to the horizontal plane including the optical axis. However, light rays which pass through focusing lens 5 and contribute to form images on the photosensitive surface define a conical beam of light shown by straight line 36 in FIG. 7, and a beam of light thereof at a section taken along line VIII — VIII is a circle 37 shown in FIG. 8. The section of a beam of light thereof at front frame 12 is a circle 38 as shown in FIG. 8 so that when guide rod 15 extends to front frame 12, it interferes with beam of light 36, thereby forming images and resulting in shadows. Furthermore, compensating component 24 is always rearward of zooming component 17 so that it is not let out nearly to front frame 12 and displaced in the rear of the vertical plane erected on the rotary shaft of the cam plate.

Figure 7:
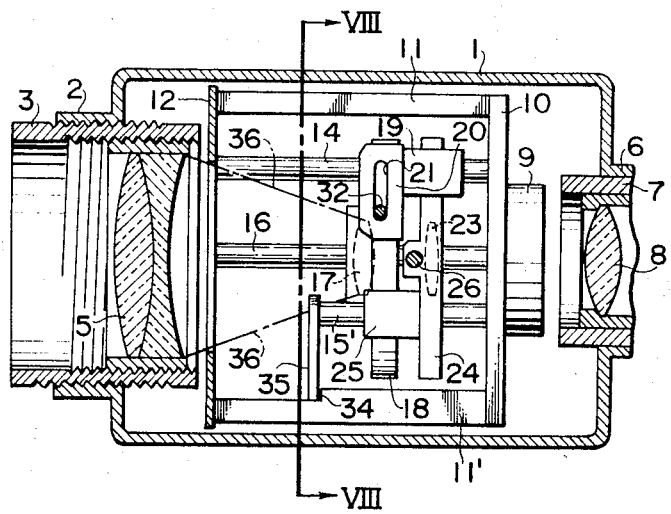
FIG. 7 is a side view in longitudinal section of another embodiment in accordance with the present invention.
Figure 8:
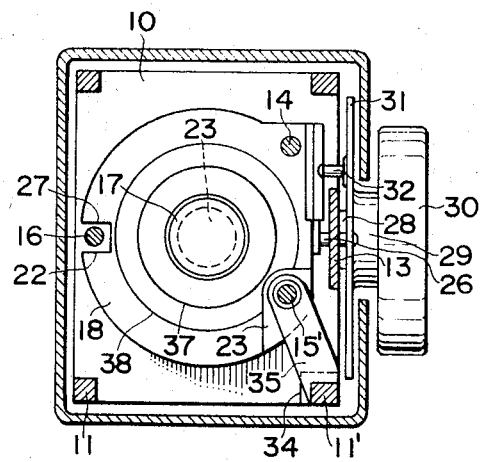
FIG. 8 is a front view in transverse section taken along line VIII — VIII of said embodiment.

Therefore, in the embodiment as shown in FIG. 7 and FIG. 8, a notched step portion 34 is formed on lower support 11' against which frame member 35 rests. A guide rod 15' extends between said frame member 35 and rear frame 10 near the horizontal plane including the optical axis so as to thereby avoid producing a shadow to the image forming light rays 36 effected by guide rod 15'.

It should be noted that the remaining elements of the second embodiment are similar to that of the first embodiment so that the description thereof is omitted.

The present invention can be variously modified within the spirit of the present invention described above.

What is claimed is:

1. Zooming device for zoom lenses, which comprises:
    two guide rods provided within a lens exterior barrel on one side of and parallel to the optical axis of the barrel;
    a zooming component frame slidably mounted on one of said guide rods for movement along the optional axis;
    a zooming component mounted on said zooming component frame;
    a compensating component frame mounted on the other of said guide rods for movement along the optical axis;
    a compensating component mounted on said compensating component frame;
    a slot provided in said zooming component frame and extending in a direction perpendicular to the moving direction thereof;
    an engagement pin projecting from said zooming component frame in a direction at right angles to the optical axis;
    a shaft provided at right angles to the optical axis; a rotatable cam plate on said shaft perpendicular to the shaft axis thereof;
    a cam slot formed in said cam plate, said engagement pin being movable within said cam slot; and
    a working projection pin extending from said cam plate and disposed for movement within said slot provided in said zooming component frame.

2. A zooming device for zoom lenses claimed in claim 1, wherein said working pin provided on said cam plate is turnable through the angle range substantially in a vertical plane to the optical axis which passes through the center of the rotary shaft of said cam plate, and said zooming component frame fits slidably in the guide rod near by said working pin.

3. A zooming device for zoom lenses claimed in claim 1, wherein at least one restraining rod is provided within said barrel on a side of the optical axis opposite and parallel to said two guide rods, said zooming component frame and said compensating component frame each being provided with a notch portion for engaging with said restraining rod, and said restraining rod being arranged to restrain the turning of both said component frames using both said guide rods in which both component frames slidably fit respectively as a center.

4. A zooming device for zoom lenses claimed in claim 3, further including a square-shaped rear frame fixed to the interior of the exterior lens barrel and at right angles to the optical axis, four supports projecting forwardly from each respective corner of said rear frame, and a front frame fixed to the front ends of said supports and at right angles to the optical axis; said two guide rods extending between said front and rear frames.

5. A zooming device for zoom lenses claimed in claim 4, wherein said front frame is provided with:
    a rearwardly bent member extending outwardly of said guide rods and parallel thereto;
    said shaft being provided outwardly of said bent member;
    a bracket rotatably fitted on said shaft;
    a knob fixed on the outer end of said bracket; and
    said cam plate being fixed to the inner end of said bracket.

6. A zooming device for zoom lens, comprising:
    supports projecting from each respective corner of a square-shaped rear frame;
    a square-shaped front frame fixed to the front ends of said supports;
    a frame member disposed between the ends of said supports;
    a first guide rod supported by said front frame and said rear frame and parallel to the optical axis;
    a second guide rod supported by said frame member and said rear frame and parallel to the optical axis;
    a zooming component frame slidably mounted on said first guide rod for movement along the optical axis and being provided with a zooming component;

a slot formed on said zooming component frame and at right angles to the moving direction of said zooming component frame;

an engagement pin projecting from the compensating component frame in a direction at right angles to the optical axis;

a shaft at right angles to the optical axis;

a rotatable cam plate at right angles to said shaft;

a cam slot formed in said plate, in which said engagement pin fits; and a working pin on said cam plate for engaging with said cam slot.

7. A zooming device for zoom lens claimed in claim 6, wherein said second guide rod is fixedly mounted between said frame member and said rear frame and parallel to the optical axis and is disposed near a plane at right angles to said cam plate including the optical axis.

* * * * *